United States Patent
Smith et al.

(10) Patent No.: US 8,696,788 B1
(45) Date of Patent: Apr. 15, 2014

(54) PROCESS FOR THE RECOVERY OF AB5 ALLOY FROM USED NICKEL/METAL HYDRIDE BATTERIES

(71) Applicant: Toxco, Inc., Anaheim, CA (US)

(72) Inventors: W. Novis Smith, Philadelphia, PA (US); Scott Swoffer, New Castle, DE (US)

(73) Assignee: Retriev Technologies Incorporated, Anaheim, CA (US)

( * ) Notice: Subject to any disclaimer, the term of this patent is extended or adjusted under 35 U.S.C. 154(b) by 0 days.

(21) Appl. No.: 13/661,922

(22) Filed: Oct. 26, 2012

Related U.S. Application Data

(63) Continuation-in-part of application No. 13/066,103, filed on Apr. 6, 2011, now Pat. No. 8,252,085, which is a continuation-in-part of application No. 12/806,877, filed on Aug. 23, 2010, now Pat. No. 8,246,717.

(51) Int. Cl.
 *C22B 3/44* (2006.01)
 *C22B 59/00* (2006.01)

(52) U.S. Cl.
 USPC .............. 75/401; 75/403; 75/711; 423/150.1

(58) Field of Classification Search
 USPC .......................... 75/401, 711, 403; 423/150.1
 See application file for complete search history.

(56) References Cited

U.S. PATENT DOCUMENTS

| | | | |
|---|---|---|---|
| 3,618,866 A | 11/1971 | Robinson | |
| 5,108,585 A | 4/1992 | Von Rybinski et al. | |
| 5,377,920 A | 1/1995 | Alavi et al. | |
| 6,110,433 A | 8/2000 | Kleinsorgen et al. | |
| 8,246,717 B1 * | 8/2012 | Smith et al. | 75/711 |
| 8,252,085 B1 * | 8/2012 | Smith et al. | 75/711 |

OTHER PUBLICATIONS

Jungst, *Recycling of Electric Vehicle Batteries; Used Battery Collection and Recycling*; G. Pistoia, J-P Wiaux and S.P. Wolsky (Editors); © 2001 Elsevier Science B.V.; pp. 295-327.

* cited by examiner

*Primary Examiner* — George Wyszomierski
*Assistant Examiner* — Tima M McGuthry Banks
(74) *Attorney, Agent, or Firm* — RatnerPrestia

(57) ABSTRACT

There is provided a process for recovering $AB_5$ alloy from spent nickel hydride storage batteries and/or their cells without thermal melting or dissolving the $AB_5$ alloy. The process comprises a step of dissolving the $Ni(OH)_2$ and separating $AB_5$ alloy and still containing the lanthanum metal.

14 Claims, No Drawings

PROCESS FOR THE RECOVERY OF AB5 ALLOY FROM USED NICKEL/METAL HYDRIDE BATTERIES

FIELD OF THE INVENTION

The present invention relates to the recovery of $AB_5$ alloy from spent nickel/metal hydride (NIMH) storage batteries and/or the electrode cells. More particularly, there is provided a process for the selective recovery of $AB_5$ alloy from NIMH storage batteries without thermal melting or dissolving the $AB_5$ alloy into solution.

BACKGROUND OF THE INVENTION

There are a number of processes described in the literature and patents for recycling NIMH batteries to recover the valuable nickel values contained in them as nickel metal grid, nickel plated foil, the nickel hydroxide in the cathode with some cobalt hydroxide and the nickel metal powder present in the anode as a nickel metal alloy with rare earth metals. Up to now the recovery processes have focused only on the nickel values which allowed for direct smelting of these batteries in furnaces as part of the feed for making high nickel alloys. The rare earth metals react under these conditions to form the rare earth oxides similar to how they are found in nature and end up in the molten oxide slag which is thrown away. More recently, processes have been described where these batteries are carefully melted and the slag volume and nature are controlled to end up with a richer rare earth slag more suitable for recovering the rare earths from the slag in the same way they are recovered by current production processes from rare ores. Another way that is being developed is the total solution of the isolated NIMH electrode materials to produce solutions of the nickel, cobalt and the rare-earth salt mixtures. These solutions are then processed by normal hydrometallurgical methods to separate the solution components into the nickel hydroxide (or carbonate), cobalt hydroxide (or carbonate) and the rare earth separated into a separate mixed rare earth component for processing on a standard rare earth oxide separation process line associated with rare earth ore processing. The reason for this change in the expansion of these recycle processes to recover the rare earth oxides is that the world supply of these oxides is 95% controlled by China and the use for rare earth compounds continues to expand. This has caused supply of rare earth to become tight and probably to remain so with the associated increase in the value of these materials.

The rare earths material are found in the NIMH battery in the unique hydrogen absorbing $AB_5$ metal alloy anode (about 32% are earth metals primarily lanthanum-25%) powder which is the key anode material found in most NIMH batteries. There is a significant amount of energy and loss material in separating then converting a rare-earth ore to the purified rare earth compound mix (25% lanthanum). The correct rare earth oxide mix is converted to the highly reactive rare earth metal mixture (Misch metal) under vacuum and very high temperatures (>1400° C.) under vacuum. This Misch metal then must be mixed with the correct amount of nickel metal and re-melted in a vacuum induction furnace and then cooled rapidly and then ground to a −325 mesh powder under inert atmosphere due to its reactivity. The very hard alloy is difficult to grind. This is a very energy intensive and costly process.

The invention is more preferably used in a cell containing a negative electrode having hydrogen storage alloy materials of the so-called $AB_5$-type, a common example of which is described in the basic formula $M_sNiAl_xMn_4Co_3$ and $M_sNi_5(Al_xMn_4Co_3)_x$ wherein $M_s$ represents a lanthanum-rich misch metal (REM), which includes various rare earth metals and wherein $2.5<r<5.0$, $0<s<2.5$, $0<t<0.5$, and $0<u<0.5$. Hydrogen absorbing alloys of this class (i.e., $AB_5$) are disclosed, for instance, in U.S. Pat. Nos. 4,216,274 (Bruning et al) and 4,375,257 (Bruning, et al).

The typical $AB_2$-type materials, as currently envisioned, are based on $TiNi_2$ and typically have the basic atomic structure Ni—Ti—V—Cr—Zr—X—Y wherein X and Y can be other elements of various selection. The invention is more preferably used in a cell containing a negative electrode having hydrogen storage intermetallic alloy materials of the so-called $AB_5$-type, a common example of which are described in the basic formula $MmNi_rCo_sMn_tAl_u$, wherein Mm represents a lanthanum-rich misch metal, which includes various rare earth metals, and wherein $2.5<r<5.0$, $0<s<2.5$, $0<t<0.5$, and $0<u<0.5$ and $M_sNiAl_xMn_4CO_3$.

Negative electrode alloys used in NiMH batteries typically comprise La, Pr and Nd as rare earth elements and Zn, Mg and Ni. Cobalt, manganese and aluminum are common additives.

The components of the NIMH battery include nickel metal grid, $Ni(OH)_2$, nickel coated iron, potassium hydroxide electrolyte, and most importantly a nickel metal alloy powder of up to 25-30% by weight. This alloy powder has been developed to absorb considerable hydrogen and is the source of the descriptor "nickel metal hydride" battery. Under charging conditions this nickel alloy absorbs significant amounts of hydrogen as the metal hydride is formed electrochemically. Under battery discharge conditions this absorbed hydrogen reacts electrochemically back to hydroxide and water providing the electrical current of the battery. The currently most well known nickel alloy used is termed $AB_5$ which is an alloy consisting of one part misch metal (mostly lanthanum or REM) to five parts nickel on a mole basis—theoretically 32.1% (REM) on a weight basis. Therefore the naturally occurring rare earth oxide mixture is used to form the misch metal which avoids the expense of separating the rare earth oxides into the individual elements before reducing them to the mixed metal and not to the pure metal such as pure lanthanum metal. This metal mixture is used which is called misch metal. Therefore the $AB_5$ alloy is an alloy of a mixture of lanthanum group metals and nickel with some cobalt and other metals added in small amounts for optimized hydrogen formation and storage. This $AB_5$ component is the most expensive raw material cost for this battery.

SUMMARY OF THE INVENTION

According to the present invention there is provided a method for the purification of a mixture of hydrogen storage intermetallic alloy $AB_5$ obtained from the crushed nickel metal hydride batteries and the electrodes of spent nickel metal hydride batteries together with any lanthanum present and optionally, the separate recovery of $Ni(OH)_2$ which is present. The process comprises the steps of (a) wet crushing nickel metal hydride batteries and cells, (b) screening the product of step (a) to recover metal particles and the resultant slurry, selectively dissolving $Ni(OH)_2$ at a pH of about 2-5 without dissolving the $AB_5$ intermetallic alloy and lanthanum; (c) filtering the product of step (b) and washing the solids; and then (d) drying the solids under an inert atmosphere and recovering the $AB_5$ and lanthanum. Advantageously, the $Ni(OH)_2$ is selectively dissolved by a non-oxidizing non-halogenated acid.

It is therefore a general object of the invention to purify a mixture containing hydrogen storage intermetallic $AB_5$ which is obtained from the electrodes of spent nickel metal hydride batteries or the crushed batteries.

It is a further object of the invention to obtain $AB_5$ and lanthanum from electrodes of spent nickel metal hydride batteries.

DESCRIPTION OF THE PREFERRED EMBODIMENTS

According to the invention there is provided a method for the purification and isolation of hydrogen storage intermetallic alloy $AB_5$ and any lanthanum present from material obtained from spent nickel metal hydride batteries and cells which comprises the steps of:

A) wet crushing nickel metal hydride batteries and cells;
B) screening the product of step A) to recover the metal particles and the slurry formed,
C) selectively dissolving the nickel hydroxide in the slurry with a non-oxidizing non-halogenated acid without dissolving said intermetallic alloy AB5 and any lanthanum present; and then
D) recovering the solids.

Advantageously, the process is carried out under an inert atmosphere.

The non-oxidizing non-halogenated acid is preferably selected from the group consisting of acetic acid, glycolic acid, formic acid and sulfuric acid.

The product of Step B) can be screened through a 25 mesh screen and then through a −200 mesh screen.

Advantageously step C) is carried out at a pH of 2-4.

The present process consists of the crushing of the steel cased battery or cells in a water mist preferably in a hammer mill and under an inert atmosphere. The wet heavy separator mat which entangles much of the coarse grid collector metal on the top of a shaker table (+¼") is screened off. This is sold for its coarse nickel metal content. It can also be pyrolyzed to remove the organic separator yielding all of the contained nickel metal powder and pieces free of organic material also for sale.

The rest of the water slurry after removing the +¼" material is further screened to −200 mesh to yield a slurry containing 85% of the starting electrode material including the $AB_5$ anode metal powder material and the nickel hydroxide cathode material with some binder. This −200 mesh slurry is neutralized to pH 5 with the non-oxidizing acid such as glycolic acid. At this point 70% glycolic acid (commercial grade) is preferably added to the aqueous slurry under an inert atmosphere in an estimated 50-95% by mole of theory amount to dissolve the calculated molar mount of nickel hydroxide present (2 moles of glycolic acid per mole of nickel hydroxide). This addition is at room temperature with high shear stirring and cooling is maintained about 18-25° C. for four hours. The slurry is allowed to settle briefly to just allow the dense $AB_5$ to settle. The solution containing the dissolved nickel glycolate or other acid salt (with some cobalt glycolate) both from the cathode and a light brown haze from the liberated organic binder is decanted off and filtered. The nickel hydroxide is recovered from this solution by adding 50% sodium hydroxide to pH 10-11 and filtering the nickel hydroxide off and drying. The glycolic acid is recovered from this filtrate for recycling back to the process by acidifying this filtrate with sulfuric acid to pH 1-2 and distilling off the water and then the glycolic acid azeotrope.

The wash decantation of the $AB_5$ metal powder may be needed several times to purge the residual binder from the $AB_5$ powder. (This can also be accomplished in a continuous controlled cyclic wash with filtration of the circulating system). The cleaned $AB_5$ is filtered and recovered under inert atmosphere. It is dried under vacuum at 100° C., cooled and screened through −325 mesh. The assay is 25% La and an oxygen content of <1.0%. The other rare earths including the cerium and yunum add up to about 6% with a few percent cobalt and aluminum. The nickel metal is the balance to about 65%. The overall recovery from the electrode is about 50-80% of the contained $AB_5$ metal in the electrode mix.

The initial slurry after screening the metal particles may be treated with a magnet to remove any small casing particles.

This selective dissolution/purification procedure will work on any mixture of the nickel metal hydride and the $Ni(OH)_2$ cathode material. It can be applied to those mixtures recovered from the processing and recycling of NIMH batteries. It can also be applied to electrode powders recovered from nickel/hydrogen batteries.

The following examples serve to explain the invention in more detail, where the examples are intended to facilitate understanding of the principle according to the invention and are not to be understood as meaning a limitation thereof.

Example 1

Ten Prius NIMH battery cells (1510 g) were stripped of their bus bars and plastic covers (1155 g after) were run through a hammer mill with an internal water spray and under nitrogen. The slurry was directed onto a shaker table with ¼" slots and the slurry passed through a 25 mesh screen (72 g+25 mesh −¼") and then through a −200 mesh screen (61 g+200 mesh/−25 mesh). The damp mat cake on the shaker table contained coarse metal pieces and weighed 262 g dry. (Pyrolysis of this mat at 280° C. under inert atmosphere gave 220 g of nickel metal powder and pieces for recovery.) The −200 mesh slurry was filtered to reduce the water content and dried under vacuum. This mixed electrode cake consisting of $AB_5$ metal powder and nickel hydroxide cathode material weighed 564 g dry. (All steps were processed under nitrogen when possible.) The dry cake contained 12% lanthanum which serves as marker for the purity of the $AB_5$ which contains about 25%-26% lanthanum. This cake was about 48% $AB_5$ at this point of recovery.

This electrode mix was processed by the addition of slightly less than stoichiometric amounts (0.5 to 0.9) of 70% glycolic acid (in mole ratios of two glycolic acid molecules for each nickel hydroxide molecule present). The analysis of the lanthanum level was indicative of the purity along with the oxygen level.

Example 2

A slurry of 80 g of the electrode mix (12% La) was slurried in 200 ml of water with high speed mixing under nitrogen. (Calculated to contain 41.6 g nickel hydroxide-0.45 moles). The slurry was adjusted to pH 5 with sulfuric acid and then 78 g (70%) glycolic acid (85% of theory) was slowly added with only slight warm up. The stifling was maintained four hours and then the slurry was allowed to settle only enough to allow the dense $AB_5$ to settle but to keep the fine brown gelatinous binder particles suspended. The total solution and binder were decanted off. This was repeated three times. The $AB_5$ was isolated by filtration and drying under vacuum and finally screening through −325 mesh. A magnet was used to remove any nickel metal fines which may still be present. The La was 25% with 0.89% oxygen and the yield was 26 g which was 68% based on the calculated amount in the cake.

Example 3

A slurry of 80 g of the electrode mix (12% La) was slurried in 200 ml of water with high speed mixing under nitrogen.

(Calculated to contain 41.6 g nickel hydroxide-0.45 moles). The slurry was adjusted to pH 5 with sulfuric acid and then 64 g glycolic acid (70% of theory) was slowly added with only slight warm up. The stirring was maintained four hours and then the slurry was allowed to settle only enough to allow the dense $AB_5$ to settle but keeping the fine brown gelatinous binder particles suspended. The total solution and binder were decanted off. This was repeated three times. The $AB_5$ was isolated by filtration and drying under vacuum and finally screening through −325 mesh. A magnet was used to remove any nickel metal fines which may still be present. The La was 25% with 0.99% oxygen and the yield was 29 g which was 76% based on the calculated amount in the cake.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the recovery of $AB_5$ intermetallic alloy from spent nickel metal hydride batteries and cells which comprises the steps of:
   A) wet crushing nickel metal hydride batteries and cells to form a slurry containing nickel hydroxide and metal particles;
   B) screening the product of step A) to separate metal particles from the slurry;
   C) treating the slurry from step B) with a non-oxidizing non-halogenated acid to selectively dissolve the nickel hydroxide in the slurry without dissolving the $AB_5$ alloy; and then
   D) recovering the $AB_5$ alloy.

2. The process of claim 1 wherein the process is conducted in an inert atmosphere.

3. The process of claim 1 wherein step B) comprises screening through a 25 mesh screen and then through a −200 mesh screen.

4. The process of claim 1 wherein the $AB_5$ alloy recovered contains lanthanum.

5. The process of claim 1 wherein the non-oxidizing non-halogenated acid of step C) is selected from the group consisting of acetic acid, glycolic acid, formic acid and sulfuric acid.

6. The process of claim 1 which comprises dissolving the nickel hydroxide in step C) at a pH of 2-5.

7. The process of claim 6 wherein the slurry from step B) is neutralized at pH 5.

8. The process of claim 1 wherein in step D) $AB_5$ alloy is recovered by allowing the $AB_5$ alloy to settle and decanting off a solution from the settled $AB_5$ alloy, and comprising the additional steps of filtering the solution to form a filtrate and treating the filtrate with a sodium hydroxide solution to pH 10-11 to precipitate nickel hydroxide.

9. The process of claim 1 wherein the electrodes of nickel metal hydroxide batteries are crushed.

10. The process of claim 1, wherein step C) comprises adding a non-oxidizing non-halogenated acid in estimated 50-95% by mole of a theoretical amount to dissolve a molar amount of nickel hydroxide present.

11. The process of claim 1 wherein in step D) $AB_5$ alloy is recovered by allowing the $AB_5$ alloy to settle and decanting off a solution from the settled $AB_5$ alloy.

12. The process of claim 11, comprising an additional step after decanting of washing the settled $AB_5$ alloy.

13. The process of claim 11, comprising additional steps after decanting of washing, filtering and drying the settled $AB_5$ alloy.

14. The process of claim 1, wherein said recovering of the $AB_5$ alloy comprises employing a circulating system, and including a continuous controlled cyclic wash with filtration of the circulating system.

\* \* \* \* \*

UNITED STATES PATENT AND TRADEMARK OFFICE
CERTIFICATE OF CORRECTION

| | | |
|---|---|---|
| PATENT NO. | : 8,696,788 B1 | Page 1 of 1 |
| APPLICATION NO. | : 13/661922 | |
| DATED | : April 15, 2014 | |
| INVENTOR(S) | : W. Novis Smith and Scott Swoffer | |

It is certified that error appears in the above-identified patent and that said Letters Patent is hereby corrected as shown below:

In the specification

At column 1, line 4 after the title, please add the following new heading and paragraph:

STATEMENT REGARDING FEDERAL FUNDING

--This invention was made with government support under Contract No. DE-EE0002610 awarded by the Department of Energy. The government has certain rights in the invention.--

Signed and Sealed this
Twelfth Day of April, 2016

Michelle K. Lee
*Director of the United States Patent and Trademark Office*